July 3, 1934.  P. M. STAEHLE  1,965,437
TRANSFORMER LEAD AND BUSHING
Filed Jan. 21, 1932
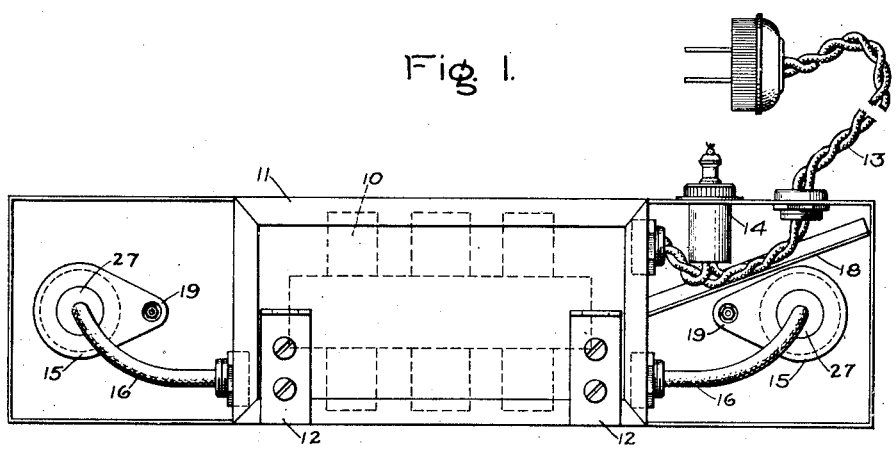
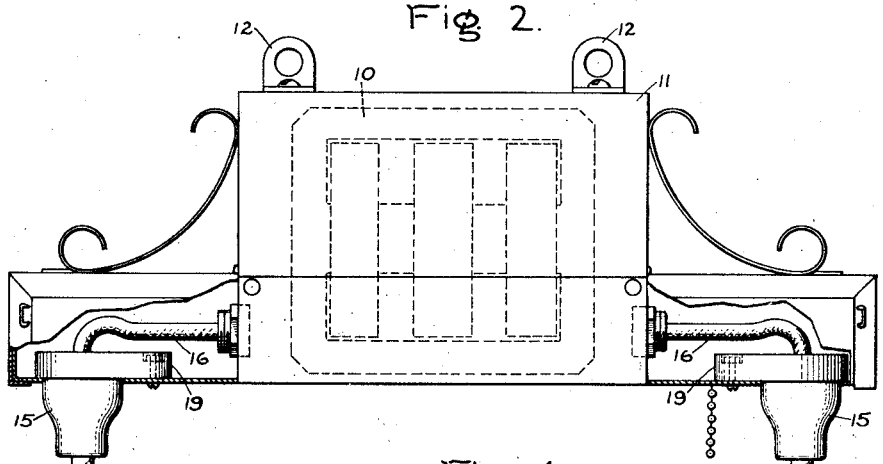
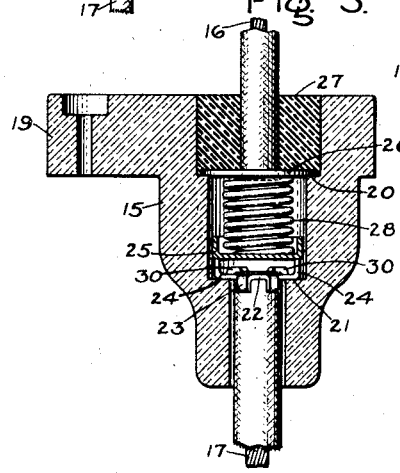
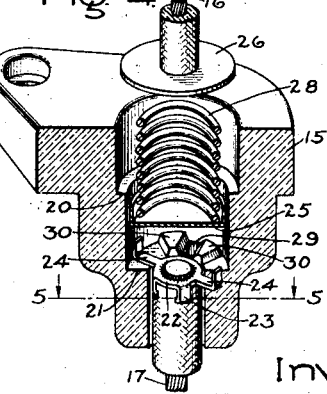
Inventor:
Paul M. Staehle,
by Charles E. Mullen
His Attorney.

Patented July 3, 1934

1,965,437

UNITED STATES PATENT OFFICE 1,965,437

TRANSFORMER LEAD AND BUSHING

Paul M. Staehle, Fort Wayne, Ind., assignor to General Electric Company, a corporation of New York Application January 21, 1932, Serial No. 587,929

1 Claim. (Cl. 173—363)

My invention relates to transformer leads and bushings. Many transformers are enclosed in metal casings and have high voltage leads extending through their casings in insulating bushings. Some of these transformers are used under such conditions that it is desirable at times to disconnect the external secondary leads from the casing. This is dangerous, however, while the transformer is excited by current in the primary winding if any conductive part of the secondary circuit still connected to the transformer is exposed. The general object of the invention is to provide an improved detachable external secondary lead and bushing construction whereby the external secondary leads may be safely detached while the transformer is excited.

The invention will be better understood from the following description taken in connection with the accompanying drawing in which Fig. 1 is a plan view of a transformer with detachable secondary high voltage leads constructed and arranged in accordance with the invention, parts of the casing being removed; Fig. 2 is a front view of the transformer with parts of the casing broken away; and Figs. 3, 4, and 5 are detail sectional views showing the secondary lead and bushing construction, Fig. 5 being a sectional view taken on the line 5—5 of Fig. 4.

Like reference characters indicate similar parts in the different figures of the drawing.

The invention will be explained in connection with the transformer 10 having a casing 11 which may be supported by hangers 12. The primary of the transformer may be connected to a suitable source of current by a pair of flexible primary leads 13, one of which is connected through a switch 14 for opening and closing the primary circuit. The high voltage secondary of the transformer is provided with secondary high voltage leads which extend through the casing 11 in insulating bushings 15. Each high voltage lead includes an internal insulated section 16 and an external insulated section 17 detachably secured together in their bushing 15 as shown in Figs. 3 and 4. An insulating barrier 18 separates the primary leads 13 from the adjacent secondary lead 16. The bushings 15 are held in place by integral side extensions 19 which are bolted to the casing.

The opening for the secondary lead in each of the bushings 15 has three parts of different diameters forming two integral shoulders or stops 20 and 21. The smallest part of the opening is between the shoulder 21 and the outer end of the bushing so that the shoulders 20 and 21 face toward the inner end of the bushing.

A terminal conductive disk 22 is secured mechanically and electrically to the end of the section 17 of the secondary lead, the ends of the strands of the conductor being extended slightly through a hole in the disk and bent over onto its surface to which they are soldered. The disk 22 has integral edge prongs 23 with pointed inturned ends which grip the insulation of the conductor and further secure the disk 22 mechanically to the conductor. The disk 22 is also provided with integral arms 24 which project laterally from the conductor and engage the shoulder 21 to hold the end of the section 17 of the secondary lead normally in place in the bushing. The outer ends of the arms 24 are bent up and support a flanged metal disk 25 in spaced relation to the shoulder 21 of the bushing.

A terminal conductive disk 26 is secured mechanically and electrically to the end of the section 16 of the secondary lead, preferably in the same manner in which the disk 22 is secured to the section 17 of the secondary lead. The disk 26 with the section 16 of the secondary lead secured to it is held against the shoulder 20 in the bushing by suitable insulating compound 27 which is filled into the inner end of the opening in the bushing while plastic and then allowed to harden. A helical metal spring 28 is held under compression between the two disks 25 and 26, the force of this spring 28 normally holding the arms 24 of the disk 22 firmly against the shoulder 21 of the bushing. There is thus a normally continuous electrically conductive connection between the two sections 16 and 17 of the secondary lead through the disk 26, the spring 28, the disk 25 and the disk 22 with its supporting arms 24, all of these conductive parts between the two sections of the lead being enclosed by the bushing 15 which effectively insulates and protects them from accidental outside contact.

The outer section 17 of the secondary lead may be readily disconnected from the inner section 16 of this lead and thus from the transformer and its casing by turning the conductor section 17 about its axis until its arms 24 register with corresponding internal grooves or passages 29 in the outer part of the bushing between the shoulder 21 and the outer end of the bushing. When in this position, the conductor section 17 with its arms 24 may be withdrawn from the bushing, the arms passing through the grooves 29. The shoulder 21 has raised portions or stops 30 between the grooves 29 and the parts of shoulder 21 which normally support the arms 24. Before the arms 24 can be turned to register with the grooves 29, the conductor section 17 must be forced slightly further into the bushing against the pressure of the spring 28 until the arms can clear the stops when turned. The stops 30 thus prevent accidental disengagement of the conductor section 17. As the conductor section 17 is withdrawn from the bushing, the disk 25 will be held in the bushing by the raised portions or stops 30 of the shoulder 21 and the secondary circuit is broken as soon as the ends of the arms 24 leave this disk 25. The conductor section 17 is thus disconnected from the transformer and is safe to handle before any uninsulated parts are withdrawn from the bushing and exposed.

The particular form and application of the invention which has been described is particularly adapted for the operation of a neon tube sign which may be connected to the lower ends of the secondary conductor sections 17 and suspended by them below the transformer and its casing.

The invention has been explained by describing and illustrating a particular form and application thereof but it is obvious that changes may be made without departing from the spirit of the invention and the scope of the appended claim.

What I claim as new and desire to secure by Letters Patent of the United States, is:

The combination with a hollow insulating bushing of a high voltage conductor, said conductor including two sections extending into opposite ends of the opening in said bushing, said bushing having two spaced integral shoulders therein, conductive disks secured to the ends of said conductor sections, means for securing one of said disks in engagement with one of said shoulders, said other disk having two lateral projections engaging the other shoulder to hold its conductor section in the bushing, and means including a metal spring for conductively connecting said disks and forcing said projections against their shoulder, said bushing having internal grooves to permit removal of said lateral projections past their shoulder, whereby said lateral projections may be removed with their conductor section from the bushing, said latter shoulder being in the path of said spring means to retain said means within the bushing when said lateral projections with their conductor section are removed.

PAUL M. STAEHLE.